(12) United States Patent
Musgrave

(10) Patent No.: US 7,655,723 B2
(45) Date of Patent: Feb. 2, 2010

(54) RADIATION RESISTANT POLYPROPYLENE MATERIALS

(75) Inventor: Mike Musgrave, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 181 days.

(21) Appl. No.: 11/743,423

(22) Filed: May 2, 2007

(65) Prior Publication Data

US 2008/0275180 A1    Nov. 6, 2008

(51) Int. Cl.
*C08L 23/14* (2006.01)
(52) U.S. Cl. .................... 524/579; 524/570; 524/583
(58) Field of Classification Search ............. 524/579, 524/570, 583
See application file for complete search history.

(56) References Cited

U.S. PATENT DOCUMENTS

| | | | |
|---|---|---|---|
| 4,431,497 A | 2/1984 | Rekers | |
| 5,415,925 A | 5/1995 | Austin | |
| 5,548,008 A * | 8/1996 | Asanuma et al. | 524/99 |
| 5,554,437 A | 9/1996 | Gupta | |
| 6,231,936 B1 * | 5/2001 | Kozimor et al. | 428/34.7 |
| 6,395,392 B1 | 5/2002 | Gownder | |
| 2005/0043450 A1 | 2/2005 | Goodrich | |

FOREIGN PATENT DOCUMENTS

| | | |
|---|---|---|
| WO | WO2004/033509 | 4/2004 |
| WO | WO 2005/056661 | 6/2005 |

* cited by examiner

*Primary Examiner*—Robert D. Harlan
(74) *Attorney, Agent, or Firm*—Tenley R. Krueger; Diane L. Kilpatrick-Lee

(57) ABSTRACT

A polypropylene material is provided having increased radiation resistance compared to solely isotactic polypropylene. The material is formed by utilizing a syndiotactic polypropylene. The isotactic polypropylene may be an isotactic metallocene or Ziegler-Natta catalyzed polypropylene and may include an amount of syndiotactic polypropylene. The material may be used in forming a variety of materials that may undergo exposure to radiation, such as sterilization procedures using radiation. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

2 Claims, No Drawings

RADIATION RESISTANT POLYPROPYLENE MATERIALS

BACKGROUND OF THE INVENTION

1. Technical Field

The invention relates generally to polypropylene and materials or articles made from polypropylene.

2. Background of the Art

Polypropylene is used for a variety of different products or applications. These may include films, fibers or molded articles. Polypropylene used in such materials or articles is usually produced as an isotactic propylene polymer, which is a stereospecific polymer.

Stereospecific polymers are polymers that have a defined arrangement of molecules in space. Both isotactic and syndiotactic propylene polymers are stereospecific. Isotactic polypropylene is characterized by having all the pendant methyl groups oriented either above or below the polymer chain or backbone. Isotactic polypropylene can be illustrated by the following general chemical formula:

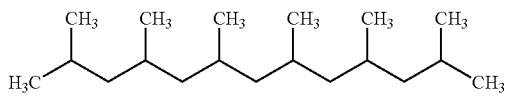

Syndiotactic propylene polymers are those in which the methyl groups attached to the tertiary carbon atoms of successive monomeric units in the polymer chain lie on alternate sides of the plane of the polymer. Syndiotactic polypropylene can be illustrated by the following general structural formula:

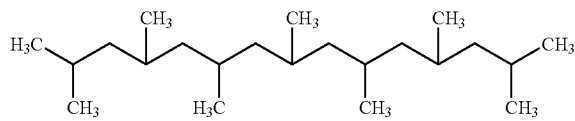

While both syndiotactic and isotactic polypropylene are semi-crystalline polymers, however, they each have different characteristics or properties.

Conventional polypropylene is usually prepared as an isotactic polymer from Ziegler-Natta polymer catalysts. The Ziegler-Natta catalysts produce a highly isotactic polypropylene that is easily processed and useful in preparing a wide variety of articles or products.

In certain applications, it is necessary that the polypropylene materials be sterilized. This is particularly true for materials used in medical and food handling and sterilization applications. One method of sterilizing such materials is through the use of high-energy radiation. Both gamma radiation and electron-beam (E-beam) radiation are commonly used for irradiating and sterilizing many materials and articles. While exposure to such radiation is effective in sterilizing such materials, the radiation may also have an effect on the material itself. In many cases, these effects are undesirable.

With respect to isotactic polypropylene prepared from conventional Ziegler-Natta catalysts, for example, exposure of the polypropylene to high-energy radiation can result in a degradation of the polymer. The polypropylene will often become brittle and may be discolored, turning to a light or deep yellow. Such changes in the polymer usually do not occur immediately after irradiation, but may occur slowly, appearing sometime later after sterilization.

The mechanism by which such degradation of polypropylene occurs is believed to be, without being limited to any one particular theory, an auto-oxidative reaction in which free radicals are formed that react with oxygen, usually from air, and which results in the degradation of the polymer. The reaction steps can be represented as follows:

$$R \rightarrow R. \tag{1}$$

$$R. + O2 \rightarrow RO2. \tag{2}$$

$$RO2. + RH \rightarrow ROOH + R. \tag{3}$$

$$RO2. + R. \rightarrow ROOR \tag{4}$$

$$RO2. + RO2. \rightarrow ROOR + O2 \tag{5}$$

$$R. + R. \rightarrow R-R \tag{6}$$

where R is the irradiated polypropylene chain, and R. is the alkyl radical formed during irradiation. The alkyl radical R. is regenerated in equation 3 and each alkyl radical formed will consume numerous molecules of oxygen unless such radicals are terminated earlier as shown in equations 4-6.

As discussed earlier, degradation effects are usually seen over time. This may be a result, at least in part, due to slower radical migration from within the crystalline regions of the polymer towards the surface to react with ambient oxygen. Thus, polymer degradation may occur over time as a result of this radical migration. Polypropylene articles having high surface areas per unit volume will usually tend to degrade much faster than those having low surface areas per unit volume.

SUMMARY OF THE INVENTION n one aspect, the invention is a polymer material including a blend of an isotactic propylene polymer and a syndiotactic propylene polymer wherein the isotactic propylene polymer has a molecular weight distribution (Mw/Mn) of 4.0 or less and a xylene solubles of 2 percent or less, and wherein the polymer material provides a SMS fabric material having a 50% or greater retention of machine direction elongation strength at a radiation dose of 3-5 Mrads.

In another aspect, the invention is a fabric including a network of fibers prepared using a polymer material including a blend of an isotactic propylene polymer and a syndiotactic propylene polymer wherein the isotactic propylene polymer has a molecular weight distribution (Mw/Mn) of 4.0 or less and a xylene solubles of 2 percent or less, and wherein the isotactic propylene polymer provides a SMS fabric material having a 50% or greater retention of machine direction elongation strength at a radiation dose of 3-5 Mrads.

In still another aspect, the invention is a fabric material in which at least two layers of fabric are laminated together wherein the layers of fabric include a network of fibers prepared using a polymer material including a blend of an isotactic propylene polymer and a syndiotactic propylene polymer wherein the isotactic propylene polymer has a molecular weight distribution (Mw/Mn) of 4.0 or less and a xylene solubles of 2 percent or less, and wherein the isotactic propylene polymer provides a SMS fabric material having a 50% or greater retention of machine direction elongation strength at a radiation dose of 3-5 Mrads.

Another embodiment of the invention is an article formed from a polymer material including a blend of an isotactic propylene polymer and a syndiotactic propylene polymer wherein the isotactic propylene polymer has a molecular weight distribution (Mw/Mn) of 4.0 or less and a xylene solubles of 2 percent or less, and wherein the isotactic propylene polymer provides a SMS fabric material having a 50% or greater retention of machine direction elongation strength at a radiation dose of 3-5 Mrads. The article is selected from a group consisting of diapers, incontinence products, sanitary towels, tampons, feminine hygiene pads, protective clothing, work clothing, disposable clothing, gowns, masks, insulating material, headwear, overshoes, flannels, bandages, bedcloths, wipes, syringes, tongue depressors, vacuum cleaner bags, tea bags, coffee filters, book covers, carpet underlay, wall coverings, bedclothes, table cloths, covers, mattress filing, covering material, furniture fabrics, cushion covers, upholstery, wadding, filters, air filters, gas filters, water filters, oil adsorbent materials, sanding material, cable sheaths, insulation tape, reinforcements, insulation, roof sealing, geotextile material, capillary mats, covering material for crop forcing, covering material for seedling protection, greenhouse shielding, packaging material, packaging material for fruits or vegetables, insulation material for automobiles, roof linings, battery separators and coating carriers, luggage, handbags, sacks, carrier bags, bags, self-adhesive materials, tents, cheese wrappers, artist's canvas and advertising articles.

DETAILED DESCRIPTION OF THE INVENTION

It has been found that addition of amounts of syndiotactic polypropylene as a blend with isotactic polypropylene, which may be either Ziegler-Natta or metallocene-catalyzed isotactic polypropylene, can increase the polymer's radiation resistance or reduce degradation of the polymer from radiation when compared to the same polymer without any syndiotactic polypropylene. These materials may show as much as 70%, 80% or even 90% retention in strength properties after exposure to high energy radiation dependent upon the dosage of radiation, the presence or absence of oxygen, and the use of antioxidants and mobilizing additives such as mineral oil.

The metallocene catalyst systems used with the invention may be selected from those useful for olefin preparation. Such metallocene catalyst systems may be characterized generally as coordination compounds incorporating one or more cyclopentadienyl (Cp) groups (which may be substituted or unsubstituted, each substitution being the same or different) coordinated with a transition metal through pi (or $\pi$) bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example, when the valence of M is 4, m may be from 1 to 3 and n may be from 1 to 3 and n+m=4.

The metal atom "M" of the metallocene catalyst compound, as described throughout the specification and claims, may be selected from Groups 3 through 12 atoms and lanthanide group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes ring, fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, 4,5-benzindenyl, 4,5-bis-benzindenyl, fluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

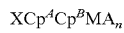

wherein X is a structural bridge, $CP^A$ and $CP^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_{20}$ alkylenes, substituted $C_1$ to $C_6$ alkylenes, oxygen, sulfur, $R_2C=$, $R_2Si=$, —$Si(R)_2Si(R_2)$—, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis (trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also include the CpFlu family of catalysts (e.g., a metallocene incorporating a substituted or unsubstituted Cp fluorenyl ligand structure) represented by the following formula:

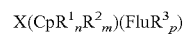

wherein Cp is a cyclopentadienyl group; Flu is a fluorenyl group; X is a structural bridge between Cp and Flu; $R^1$ is a substituent on the Cp; n is 0, 1, or 2; $R^2$ is a substituent on the Cp at carbons 3 or 4 (a position which is proximal to the bridge); m is 0, 1, or 2; each $R^3$ is the same or different and is a hydrogen or a hydrocarbyl group having from 1 to 20 carbon atoms with $R^3$ being substituted at carbons 2, 3, 4, 5, 6, or 7 (a nonproximal position on the fluorenyl group) and at least one other $R^3$, if present, being substituted at an opposed position on the fluorenyl group; and p is 0, 1, 2, 3, or 4.

Exemplary CpFlu molecules include those having a general structure such as:

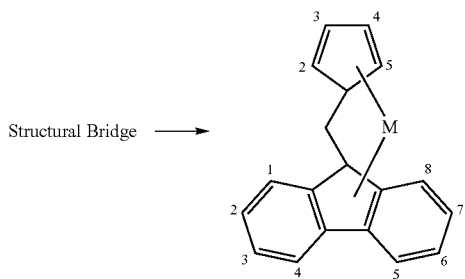

wherein M is a metal, the X in this embodiment is a methylene structural bridge. Note that all rings are aromatic notwithstanding the placement of the double bonds in the general structure.

The bis-indenyl metallocene catalysts are also useful in olefin polymerization. A bridged metallocene, the bis-indenyls may be described by the general formula:

$$XCp^A Cp^B MA_n$$

wherein X, M and A are as described above, but $Cp^A$ and $Cp^B$ each denote an indenyl group. These catalysts have been reported to be particularly useful for production of isotactic polypropylene in U.S. Pat. No. 6,414,095, the contents of which are incorporated herein by reference.

Exemplary bis-indenyl molecules include those having a general structure such as:

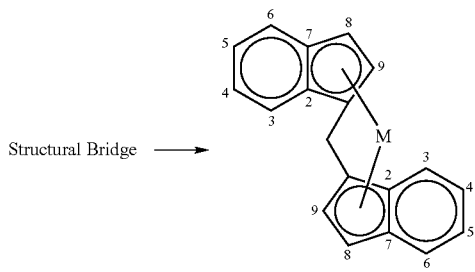

wherein M is a metal, and the X in this embodiment is a methylene structural bridge.

Another family of the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. No. 6,069,213, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213, which are incorporated by reference herein.

The metallocenes may be present as racemic or meso compositions. In some embodiments, the metallocene compositions may be predominantly racemic. In other applications, the metallocenes may be predominantly meso.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyi)(9-fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fiuorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
ethylenebis(1-indenyl)zirconium$A_n$,
ethylenebis(2-methyl-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyi)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$, dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyi(cyclopentadienyl)(9-fluorenyl)zirconium$A_n$,
diphenylsilyi(cyclopentadienyl)(9-fluorenyi)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl) (2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecycicyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bis(n-oxtylcyclopentadienyl)zirconium$A_n$,
bis(n-pentylcyclopentadienyl)zirconium$A_n$,
bis(n-propylcyclopentadienyl)zirconium$A_n$,
bis(trimethylsilylcyclopentadienyl)zirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilyiethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycioundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titaniuman,
methylphenylsilyl(tetramethylcyclopentadienyl)(n-decylamido)titaniuman,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$, diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titaniuman$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$, and derivatives thereof.

As used herein, the term "metallocene activator" is defined to be any compound or combination of compounds, supported or unsupported, which may activate a single-site catalyst precursor compound (e.g., metallocenes, Group 15 containing catalysts, etc) to form the metallocene catalyst system. Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as the aluminoxanes as activators. Aluminoxanes are well known in the art and can be made by conventional methods, such as, for example admixing an aluminum alkyl with water. Nonhydrolytic routes to form these materials are also known. Traditionally, the most widely used aluminoxane is methylaluminoxane (MAO), an aluminoxane compound in which the alkyl groups are methyls. Aluminoxanes with higher alkyl groups include hexaisobutylalumoxane (HIBAO) isobutylaluminoxane, ethylaluminoxane, butylaluminoxane, heptylaluminoxane and methylbutylaluminoxane; and combinations thereof. Modified aluminoxanes (e.g., "MMAO"), may also be used. The use of MAO and other aluminum-based activators in polyolefin polymerizations as activators are well known in the art.

Ionizing activators are well known in the art and are described by, for example, *Eugene You-Xian Chen & Tobin J Marks, Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorinated aryl groups, the groups being highly fluorinated phenyl and highly fluorinated naphthyl groups.

Illustrative, not limiting examples of ionic ionizing activators include trialkyl-substituted ammonium salts such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;
N,N-dialkylanilinium salts such as:
N,N-dimethylaniliniumtetraphenylboron,
N,N-diethylaniliniumtetraphenylboron,
N,N-2,4,6-pentamethylaniliniumtetraphenylboron and the like;
dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenylboron,
tridimethylphenylphosphoniumtetraphenylboron,
and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

Other activators include those described in WO 98/07515 such as tris(2,2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in for example, U.S. Pat. Nos. 5,849,852 5,859,653 and 5,869,723; and WO 98/32775.

In general, the activator and catalyst component(s) may be combined in mole ratios of activator to catalyst component from 1000:1 to 0.5:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 10,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (e.g., Al from MAO:Zr from metallocene) ranges from 40 to 1000 in one embodiment, ranges from 50 to 750 in another embodiment, ranges from 60 to 500 in yet another embodiment, ranges from 70 to 300 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlalky, *Heterogeneous Single-Site Catalysts for Olefin Polymerization* 100(4) CHEMICAL REVIEWS 1347-1374 (2000).

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 m$^2$/g to 1,000 m$^2$/g, or from 100 m$^2$/g to 500 m$^2$/g, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment of the process, MAO is first reacted with silica and then a metallocene is added to prepare a catalyst. Other methods and order of addition will be apparent to those skilled in the art. Such processes are known in the art and disclosed in, for example, U.S. Pat. Nos. 6,777,366 and 6,777,367, both to Gauthier, et al., and incorporated herein by reference.

In one embodiment, the heterocyclic compound described above is combined with an alkyl aluminum scavenger. The alkyl aluminum compounds can remove or mitigate materials such as water and oxygen that could otherwise interfere with the metallocene catalysts. Non-limiting examples of alkylaluminums include trimethylaluminum, triethylaluminum (TEAL), triisobutylaluminum (TIBAL), tri-n-hexylaluminum, tri-n-octylaluminum, tri-iso-octylaluminum, triphenylaluminum, and combinations thereof. While most often used as scavengers, the compounds can also, in some applications, function as cocatalysts or activators also. One of ordinary skill in the art of performing metallocene catalyzed polyolefin polymerizations will be versed in selecting and employing such scavengers.

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin. Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 m$^2$/g to 1,000 m$^2$/g, or from 100 m$^2$/g to 400 m$^2$/g, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is fully incorporated by reference herein. The methods generally include reacting neutral anion precursors that are sufficiently strong Lewis acids with the hydroxyl reactive functionalities present on the silica surface such that the Lewis acid becomes covalently bound. Activators may also be incorporated onto the support, using processes such as those disclosed in, for example, U.S. Pat. Nos. 6,777,366 and 6,777,367, both to Gauthier, et al., both of which are fully incorporated herein by reference.

To prepare a polymer it is necessary, in general, to contact the monomer or mixture of monomers and the given metallocene catalyst and the described cocatalyst(s). In certain cases it is desirable that the catalyst has been preactivated. Those skilled in the art will understand that this refers to subjecting the metallocene catalyst to conditions that promote the desired interaction between the activator or cocatalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is fully incorporated herein by reference. Other methods can be used. Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The metallocene catalysts described herein may be used to make copolymers using monomers including ethylene and propylene. A variety of processes may be employed to prepare the copolymers. Among the varying approaches that may be used include procedures set forth in, for example, U.S. Pat. No. 5,525,678, which is fully incorporated herein by reference. The equipment, process conditions, reactants, additives and other materials will, of course, vary in a given process, depending on the desired composition and properties of the polymer being formed. For example, the processes discussed in any of the following patents may be useful, each of which is fully incorporated herein by reference: U.S. Pat. Nos. 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173.

The catalyst systems described herein, including the identified family of cocatalysts, may be used over a wide range of temperatures and pressures. The temperatures may be in the range of from about 20° C. to about 280° C., or from about 50° C. to about 200° C. and the pressures employed may be in the range of from 1 atmosphere to about 500 atmospheres (0.10 mPa to 50.66 mPa) or higher. Such polymerization processes include solution, bulk, gas phase, slurry phase, high pressure processes, and combinations thereof.

Examples of solution processes are described in U.S. Pat. Nos. 4,271,060; 5,001,205; 5,236,998; and 5,589,555; and are fully incorporated herein by reference.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399; 4,588,790; 5,028,670; 5,317,036; 5,352,749; 5,405,922; 5,436,304; 5,456,471; 5,462,999; 5,616,661; and 5,668,228 are fully incorporated herein by reference.

The reactor pressure in a gas phase process may vary from about 100 psig to about 500 psig (about 689.47 kPa to about 3,447.38 kPa), or from about 200 to about 400 psig (1378.95 kPa to 2757.90 kPa), or from about 250 to about 350 psig (1723.69 kPa to 2413.16 kPa). The reactor temperature in a gas phase process may vary from 30° C. to 120° C. in one embodiment, or 60° C. to 115° C. in an additional embodiment, or 70° C. to 110° C. or 70° C. to 95° C. in further embodiments.

Other gas phase processes contemplated by the process includes those described in U.S. Pat. Nos. 5,627,242; 5,665,818; and 5,677,375; and European publications EP-A-0 794 200; EP-A-0 802 202; and EP-B-634 421; all of which are fully incorporated herein by reference.

Slurry processes generally include forming a suspension of solid, particulate polymer in a liquid polymerization medium, to which monomers and optionally hydrogen, along with catalyst, are added. The suspension, including the polymerization diluent, may be intermittently or continuously removed from the reactor where the volatile components may be separated from the polymer and recycled, optionally after a distillation, to the reactor. The liquefied diluent employed in the polymerization medium is typically an alkane having from 3 to 7 carbon atoms, preferably a branched alkane. The medium employed should be liquid under the conditions of polymerization and relatively inert, such as hexane or, in one particularly desirable embodiment, isobutane.

The catalyst as a slurry or as a dry free flowing powder may be injected regularly to the reactor loop, which can itself be filled with circulating slurry of growing polymer particles in a monomer. Hydrogen, optionally, may be added as a molecular weight control. The reactor may be maintained at a pressure of from about 27 bar (2.7 mPa) to about 45 bar (4.5 mPa) (and a temperature of from about 38° C. to about 121° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres (0.10 to 5.06 mPa) and even greater and temperatures of from about 0° C. to about 120° C.

A solution process can also be used. Examples of solution processes are described in U.S. Pat. Nos. 4,271,060; 5,001,205; 5,236,998; and 5,589,555, all of which are fully incorporated herein by reference.

In one embodiment the invention may be a copolymer prepared using a metallocene catalyst wherein the metallocene catalyst includes a bis-indenyl metallocene. The copolymer may be a random copolymer of propylene and ethylene. Ethylene may be present at weight percentage of from about 3 to about 5 percent. The copolymer may have a ductile/brittle transition of from about −7° C. to about 0° C. The copolymer may have a melting point of from about 108 to about 120 and, in one embodiment, has a melting point of about 114° C.

In another embodiment, the invention may be a copolymer prepared using a metallocene catalyst wherein the metallocene catalyst includes a CpFlu metallocene. The copolymer may be a random copolymer of propylene and ethylene. Ethylene may be present at weight percentage of from about 1.8 to about 3 percent. The copolymer may have a ductile/brittle transition of from about −7° C. to about 0° C. The copolymer may have a melting point of from about 108 to about 120 and, in one embodiment, may have a melting point of about 113° C.

The metallocene random copolymer may have an ethylene content, typically greater than about 2.0 weight %, alternatively greater than about 5 wt %, alternatively greater than about 6 wt %, and even about 6.5 wt %, as measured by carbon-13 nuclear magnetic resonance spectroscopy ($^{13}$C-NMR). All weight percentages (wt %) are per total weight of the copolymer. Metallocene random copolymers of the invention may be produced and marketed under the same name but different lots might have differences in the levels of ethylene and in other characteristics. As with other random copolymers, the ethylene may be in the backbone of the polymer chain, randomly inserted in the repeating propylene units.

The processes useful in preparing metallocene random copolymers having good impact resistance and high clarity are well known in the art of preparing such copolymers and may be made by using processes such as those disclosed in U.S. Pat. Nos. 5,158,920; 5,416,228; 5,789,502; 5,807,800; 5,968,864; 6,225,251; and 6,432,860; all of which are fully incorporated herein by reference. Standard equipment and procedures as are well known in the art may be used to polymerize the propylene and ethylene into the metallocene random copolymer.

A clarifier may optionally be added to the metallocene random copolymer for clarity enhancement. Since the clarifier is not necessarily included in the metallocene random copolymer, the lower limit on the amount of clarifier is 0 parts per million (ppm) by weight. The upper limit may be typically the U.S. Food and Drug Administration limit on such materials, which in this case is 4000 ppm. A desirable range for the clarifier may be 1000 ppm to 3000 ppm. A more desirable clarifier level may be about 2000 ppm. Suitable clarifiers include dibenzylidene sorbitols (CDBS), organophosphate salts, and phosphate esters. Examples of a commercially available clarifiers are Millad 3988, 3905, and 3940, powdered sorbitols available from Milliken Chemical of Spartanburg, S.C.; NA-11 and NA-21 phosphate esters available from Asahi Denka Kogyo; NC-4 from Mitsui Chemicals; HPN-68, a norbornane carboxylic-acid salt available from Milliken Chemical; and Irgaclear D or DM sorbitol based clarifiers available from Ciba Specialty Chemicals. Of course other clarifiers known to one skilled in the art for such purposes can also be used.

If the clarifier is to be included in the metallocene random copolymer, the clarifier, typically in the form of a powder or pellet, may be added to the copolymer after the polymerization process described above but before the copolymer is melted and formed into pellets. The copolymer and the clarifier are typically dry blended into a polymer blend for subsequent forming into end-use articles. Examples of apparatus suitable for blending the materials include a Henschel blender or a Banbury mixer, or alternatively low shear blending equipment of the type that typically accompanies a commercial blow molding or sheet extrusion line. The clarifier increases clarity by greatly increasing the rate of crystal formation in the copolymer. During the normal, slower crystallization process, relatively large crystals tend to form. These large crystals refract light and thus reduce the clarity of a copolymer. When the clarifier is added, the higher rate of crystal formation results in a greater number of smaller-sized crystals. The smaller crystals allow light to pass without refraction, thus increasing the clarity of the copolymer.

In addition to the clarifier, other additives may optionally be added to the metallocene random copolymer. The additives may include stabilizers, ultraviolet screening agents, oxidants, antioxidants, anti-static agents, ultraviolet light absorbents, lubricants, fire retardants, processing oils, mold release agents, coloring agents, pigments, nucleating agents, fillers, and the like. Additives may be suited for the particular needs or desires of a user or maker and various combinations of the additives may be used.

In some embodiments of the invention, the additives used may include a neutralizer such as Irganox 1076 and/or Irgafos 168, which are commercially available from the Ciba-Geigy Corporation. In other embodiments, the additive used may include Ethanox 330, an antioxidant available from Ethyl. In another embodiment, the additives used may include a hydrotalcite such as those with the trade name DHT4A, available from Kyowa Chemical Industries Co., LTD, for example. Another neutralizer that may be used with the invention is calcium stearate.

The radiation exposure may be from, for example, $Co^{60}$ gamma radiation or lower level radiation, such as that from E-beam radiation. The radiation exposure may be that used in sterilization techniques for medical or food handling applications. The materials of the invention may have application where radiation exposure is usually in the range of 1-6 mega rads (Mrads).

Ziegler-Natta catalysts also useful in the preparation of isotactic polypropylene are typically derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al., and which are fully incorporated herein by reference, are supported catalysts. Silica may also be used as a support. The supported catalyst may be employed in conjunction with a co-catalyst or electron donor such as an alkylaluminum compound, for example, triethylaluminum (TEAl), trimethyl aluminum (TMA) and triisobutyl aluminum (TiBAl). Ziegler-Natta catalyst systems incorporating diethers and succinates may also be used with the invention.

The isotactic polypropylene used in the present invention may be a propylene homopolymer, which may be prepared from either Ziegler-Natta or metallocene catalyst useful in preparing istoactic polymers. As used herein, "homopolymer" shall mean those polymers having less than about 0.1% by weight of polymer of other comonomers. The isotactic polypropylene component employed will typically have a meso dyad content, as determined by $^{13}$C-NMR spectra, of at least 75%, and may be at least 95% or more. For metallocene-catalyzed isotactic polypropylene the polymer will typically have a molecular weight distribution or polydispersity index (Mw/Mn) of less than about 4.0, with from about 2.5 to about 3.5 being typical. Reactor grade metallocene-catalyzed polypropylenes typical have a melt flow rate of from about 0.5 g/10 minutes to about 48 g/10 min, but is often further treated to produce melt flow rates targeted for specific applications. For example, polymers to be employed in spunbond applications may typically have a melt flow rate of from about 14 to about 37 g/10 minutes. In another embodiment, the polymer to be used in a melt blown application may have a melt flow rate of from about 50 to about 1700 g/10 minutes, as measured by ASTM-D1238, Condition L at 230° C. The metallocene-catalyzed isotactic polypropylene may have a xylene solubles of less than about 1 weight percent, with from about 0.2 to about 0.5 being typical, as measured by ASTM-D5492.

For Ziegler-Natta isotactic polypropylene, the polymer may typically have a molecular weight distribution of from about 4 to about 15. Controlled rheology Ziegler-Natta polypropylene polymers typically have a higher xylene solubles compared to miPP. The ZNiPP will typically have xylene solubles of greater than 1, more typically from about 1.5 to about 5.0, with 2% being common. Because reactor-grade ZN-iPP typically has a fairly broad molecular weight distribution, it is often necessary for the polymer to undergo further processing to narrow its molecular weight distribution, such as for use in high speed melt spinning.

The isotactic polypropylene used in the present invention may also include isotactic propylene random copolymers, which may be prepared from either Ziegler-Natta or metallocene catalysts useful in the preparation of isotactic polymers. As used herein, "copolymers" shall mean those propylene polymers having 0.1% or more by weight of polymer of other comonomers. The isotactic propylene component of the random copolymers employed will typically have a meso dyad content, as determined by $^{13}$C-NMR spectra, of at least 75%, and may be at least 95%. Those isotactic copolymers typically used in the present invention are those propylene copolymers of the olefin monomers having from 2 to 10 carbon atoms, with ethylene being the most typical comonomer employed. Typically, the comonomer will make up from about 0.1% to about 10% by weight of polymer, with from about 0.5% to about 6% being typical, and from 1% to about 3% being more typical. Copolymers will often have higher xylene solubles content.

The syndiotactic polypropylene used in the present invention may be a polypropylene homopolymer or polypropylene random copolymer. The syndiotactic polypropylene component typically has a racemic dyad content, as measured by $^{13}$C-NMR spectra, of at least 75%, and may be at least 90% or more. The syndiotactic polypropylene will typically have a molecular weight distribution (MWD) or polydispersity index (Mw/Mn) of less than about 5, and may typically range from 2 to about 4.5. The melt flow rate of the syndiotactic polypropylene will usually be from about 5 g/10 minutes to about 30 g/10 minutes, with from about 10 g/10 minutes to about 20 g/10 minutes being more typical. The melt flow rate of the syndiotactic polypropylene may vary, however, depending upon the particular application. The metallocene-catalyzed syndiotactic polypropylene may have a xylene solubles of less than about 9, with from about 4 to about 9 being typical.

The syndiotactic polypropylene may also include copolymers of olefin monomers having from 2 to 10 carbon atoms, with ethylene being the most common comonomer employed. Typically, the comonomer will make up from about 0.1% to about 10% by weight of polymer, with from about 0.5% to about 6% being typical, and from 1% to about 3% being more typical.

The addition of syndiotactic polypropylene as a blend with isotactic polypropylene, either Ziegler-Natta or metallocene-catalyzed isotactic polypropylene has been found to increase the polymer's radiation resistance or reduce degradation of the polymer from radiation when compared to the same polymer without the syndiotactic polypropylene. Where such blends are employed, the amount of syndiotactic polypropylene may be less than 20% by total weight of polymer, with from about 0.5% to about 10% being more typical. The polymer blends may be melt blended within an extruder, such as during extrusion of the polymer sheet. Alternatively, the polymer blends may be reactor blended, such as described in U.S. Pat. No. 6,362,125, which is fully incorporated herein by reference.

The final melt flow rate of the polypropylene materials may vary, depending upon the particular application. In certain cases the propylene polymers may be modified or degraded to further change the characteristics of the polymer through controlled rheology techniques, which are known to those skilled in the art. This is typically done to adjust the polymer's final melt flow characteristics so that it has a higher melt flow rate. This may be particularly true with respect to ZN-iPP, which typically has a low MFI without CR'ing. Modification of the polymer may be accomplished through the addition of peroxides or other free-radical initiators, which degrade the polymer to thereby increase its melt flow rate.

The isotactic and syndiotactic propylene polymers may contain radiation stabilization additives or combinations of such stabilizers. These additives or stabilizers react with the alkyl radicals formed during irradiation and thereby terminate the chain reaction early on and thus reduce loss of polymer properties.

Such radiation stabilizers include the non-phenolic compounds of benzhydrols or derivatives of benzhydrol. Such compounds are aromatic compounds and are described in U.S. Pat. No. 4,431,497, which is herein incorporated by reference. Such stabilizers typically used in amounts of from about 500 to about 5000 ppm although these amounts may vary.

The stabilizers may also include the hindered amine light stabilizer (HALS) compounds, such the tetraalkyl-piperidene-containing polytriazine compounds, including the derivatives of 2,2,6,6-tetramethylpiperidine. Such compounds are described in U.S. Pat. Nos. 4,086,204, 4,234,707, 4,331,586, 4,335,242, 4,459,395, 4,492,791, 5,204,473 and 6,409,941, as well as EP0053775, EP0357223, EP0377324, EP0462069, EP0782994, and GB 2,301,106, all of which are herein incorporated by reference. An example of a suitable stabilizer is:

poly[[6-[(1,1,3,3-tetramethylbutyl)amino]-1,3,5-triazine-2, 4-diyl][(2,2,6,6-tetramethl-4-piperidinyl)imino-1,6-hexanediyl[2,2,6,6-tetramethyl-4-piperidinyl)imino]]), which is commercially available as CHIMASSORB 944, from Ciba Specialty Chemicals, Inc. Such compounds are typically used in amounts of from about 0.05 to about 1.0% by weight of polymer, although these amounts may vary.

Another useful stabilizer is the benzofuran-2-one type compounds. Such compounds are described in U.S. Pat. Nos. 4,325,863; 4,388,244; 5,175,312; 5,252,643; 5,216,052; 5,369,159; 5,488,117; 5,356,966; 5,367,008; 5,428,162; 5,428,177; 5,516,920 and 6,140,397, all of which are herein incorporated by reference. Such stabilizers are carbon-centered free radical scavengers may be used alone, or in combination with other stabilizers. The benzofuran-2-one type compounds may be used to regenerate such compounds in a regeneration cycle, where such compounds would be otherwise depleted during use. An example of a useful benzofuran-2-type compound is 5,7-di-t-butyl-3-(3,4 di-methylphenyl)-3H-benzofuran-2-one, which is commercially available as HP-136, from Ciba Specialty Chemicals, Inc. Such compounds are typically used in amounts of from 0.005 to about 0.05% by weight of polymer, although these amounts may vary.

Other additives may include such things as acid neutralizers, anti-static agents, lubricants, filler materials, mobilizing agents such as hydrocarbons, halogenated hydrocarbons, phthalates, polymeric fats, vegetable oils, silicone oils, and the like, which are well known to those skilled in the art.

The choice of radiation stabilizers or other additives may depend upon the type of polypropylene employed. Certain stabilizers or additives may react with peroxide used during controlled rheology so that they are consumed or are less effective. With respect to the radiation stabilizers or antioxidants, these may be consumed by the reaction with peroxide so that their effectiveness in preventing degradation from radiation exposure is reduced or eliminated.

Because reactor-grade metallocene-catalyzed polypropylene materials may have a higher melt flow rate than reactor-grade Ziegler-Natta-catalyzed polypropylenes, it may not be necessary for the miPP or msPP materials to be processed further through controlled rheology techniques. The addition of peroxide to the polymer during controlled rheology to increase the polymer's melt flow rate may thus be eliminated in these materials. Thus, the metallocene-catalyzed polymers may contain little or no peroxide or peroxide residues to react with the radiation stabilizers or other antioxidants.

Polypropylene fibers prepared from the radiation resistant polypropylene material may be used in fabrics and textiles and can be prepared using a variety of different methods. Such methods include spinning, melt blowing and the fibrillation of films into fibers. The polypropylene fibers may have different deniers, lengths and cross-sectional configurations and can be consolidated or networked in many different ways to provide fabrics and textiles having different characteristics and properties. The fibers may be formed into both woven and non-woven fabrics. Woven fabrics are formed through the conventional weaving or knitting techniques.

Non-woven materials may be produced using spunbonding or melt blowing techniques, in which the fabric is formed from generally continuous polymer fibers that are joined together at random cross-over points. Melt blown fibers typically have a denier of from about 50 to about 2000. They may be formed using polypropylene polymers having a final melt flow of about 700 to about 2000 g/10 min, more typically from about 800 to about 1500 g/10 minutes and with a molecular weight distribution of from about 2.5-4.5. Spunbond fibers typically have a denier of from about 20 to about 40. They may be formed from polypropylene having a final melt flow of about 15 to about 45 g/10 minutes, more typically from about 20 to about 35 g/10 minutes and having a molecular weight distribution of from about 2 to 4.5.

Additionally, staple fibers, which are filaments or fibers that are cut into smaller lengths or "staples," can be formed into non-woven fabric material. Staple fibers typically have a denier of from about 1.5 to about 5.0. They may be formed from polypropylene having a final melt flow of about 4 to about 20 g/10 min, more typically from about 5 to about 15 g/10 minutes and having a molecular weight distribution of from about 2 to about 10, more typically from about 2 to about 8. Such staple fibers may be carded and joined together, such as through thermal bonding or by needle punch. The fibers may also be entangled or otherwise networked into a fabric material, such as through hydroentaglement or otherwise.

Different materials may be laminated or formed into composite materials. Two or more fabric materials may be joined together. Further, one or more fabrics may be joined to a layer or layers of film or to other non-fabric materials, such as superabsorbents or activated charcoal. The polypropylene or polymer materials are typically joined together through thermal bonding, however, resin bonding or other bonding methods may be employed as well.

One particular laminated or composite fabric that is commonly manufactured is spunbonded-meltblown-spunbonded (SMS) composite fabric material. This material utilizes outer layers of spunbonded nonwoven fabric, which provide strength to the fabric. The outer layers of spunbonded fabric are laminated to an inner layer of meltblown nonwoven fabric material, which serves as a barrier layer. The resulting composite fabric has good strength and barrier properties. SMS fabrics are often employed in medical and surgical environments in which the material must be sterilized. As a result, it is important for such materials to have good resistance to radiation.

The polypropylene materials may be used for or in a variety of different products or articles. Non-limiting examples include materials for diapers or incontinence products, sanitary towels, tampons and pads, protective and work clothing, disposable clothing, gowns, masks, insulating material, headwear, overshoes, flannels, bandages, bedcloths, wipes, syringes, tongue depressors, vacuum cleaner bags, tea bags and coffee filters, book covers, carpet underlay, wall coverings, bedclothes, table cloths, covers, mattress filing and covering material, furniture fabrics, cushion covers, upholstery and wadding, filters, air filters, gas filters, water filters, oil adsorbent materials, sanding material, cable sheaths, insulation tape, reinforcements, insulation, roof sealing. They may be used in geotextiles, such as in road and railway construction, dyke and canal construction, soil stabilization, drainage systems, golf, park and sporting ground surfacings, capillary mats in farming and agriculture, covering material for crop forcing and seedling protection. The materials may be used for greenhouse shielding and as packaging materials for fruits, vegetables or produce. The materials may be used in the automobile industry as insulation material, roof linings, battery separators and coating carriers. They may be used for luggage and handbags, sacks, carrier bags, bags, packaging. They may be used in self-adhesive materials, tents, cheese wrappers, artist's canvas and in advertising articles.

Metallocene catalyzed isotactic and syndiotactic polypropylene homopolymers, ethylene propylene random copolymers, and heterophasic copolymers offer superior properties after irradiation in other applications. Ziggler-Natta catalyzed polypropylene polymers and copolymers are often used in gamma resistant applications requiring moderate impact resistance after irradiation such as but not limited to: sterilization of food packaging, laboratory equipment, and medical applications. Metallocene catalyzed polymers and copolymers are more resistant to the degradation caused by irradiation. Many medical or food applications such as these require low odor and low aqueous or chemical extractables, thus metallocenes that do not use peroxides or use less peroxide may be particularly useful.

Other reasons why metallocenes catalyzed polymers and copolymers are well suited for these applications include 1) they have less extractables relative to Ziegler-Natta catalyzed resins with similar copolymer content, 2) they retain their clarity at ethylene levels above 3 wt % by NMR, and 3) improved mixing with other polymers and copolymers and color concentrates because of narrow molecular weight distribution. In these applications, the metallocene catalyzed polymers and copolymers may be either neat or blended with other non-metallocene polymers and copolymers.

The following examples are provided to more fully illustrate the invention. As such, they are intended to be merely illustrative and should not be construed as being limitative of the scope of the invention in any way. Those skilled in the art will appreciate that modifications may be made to the invention as described without altering its scope. For example, selection of particular monomers or combinations of monomers; and modifications such as of catalyst concentration, feed rate, processing temperatures, pressures and other conditions, and the like, not explicitly mentioned herein but falling within the general description hereof, will still fall within the intended scope of both the specification and claims appended hereto.

EXAMPLES

Various polypropylene materials were prepared for use in fabric materials. The characteristics and properties of the polypropylene materials used are presented in Table 1, below. Unless otherwise specified, all percentages are by total weight of polymer.

TABLE 1

|  | Resin Sample | | | |
|---|---|---|---|---|
|  | 1 ZN-iPP (Spunbond) | 2 m-sPP | 3 ZN-iPP (Melt Blown) | 4 m-iPP |
| Initial MFR (g/10 min) | 1.5 | 4 | 350 | 30 |
| Final MFR (g/10 min) | 22 | 4.5 | 918 | 32 |
| Additives |  |  |  |  |
| DHT-4A, (%)[A] | 0.02 | 0.02 | 0.02 | 0.02 |
| Milliken RS200 (%) | 0.2 | 0.2 | 0.2 | 0.2 |
| Chimasorb 944 (%) | 0.2 | 0.2 | 0.2 | 0.2 |
| Lupersol 101 (%) | 0.05 | 0 | n.a.[B] | 0 |
| GMS (%)[C] | 0.04 | 0.04 | 0.04 | 0.04 |
| EBS (%)[D] | 0 | 0.1 | 0 | 0 |

[A]Stabilizer from Kyowa Chemical Industry Co
[B]Amount not precisely known but estimated to be about 600-800 ppm
[C]Glycerol monostearate
[D]Ethylene bisstearamide The above materials are used in forming either spunbonded or melt blown fiber materials. The syndiotactic polypropylene of Sample 2 was combined with isotactic polypropylene of both Samples 1 and 4 in amounts of approximately 5% by total weight of polymer by pellet/pellet tumble blending.

Table 2 sets forth the make up of the different fabric samples. These materials are then used to prepare a spunbonded/melt-blown/spunbonded (SMS) laminated fabric. The SMS fabric is produced on a 1.5 meter STP Impianti SMS fabric line, which utilizes two spunbonded beams and a single melt blown die. The spunbond unit had a slot-design aspirator unit to draw down the fibers at approximately 2000 m/min. The melt spinning temperatures at the spunbond beam were held constant at approximately 235° C.

TABLE 2

| SMS Fabric Sample | 1st Spunbond Layer | Melt Blown Layer | 2nd Spunbond Layer |
|---|---|---|---|
| 1* | ZN-iPP (Sample 1) | ZN-iPP (Sample 3) | ZN-iPP (Sample 1) |
| 2 | ZN-iPP (Sample 1) + 5 wt % m-sPP (Sample 2) | ZN-iPP (Sample 3) | ZN-iPP (Sample 1) + 5 wt % m-sPP (Sample 2) |
| 3* | m-iPP (Sample 4) | ZN-iPP (Sample 3) | m-iPP (Sample 4) |
| 4 | m-iPP (Sample 4) + 5 wt % m-sPP (Sample 2) | ZN-iPP (Sample 3) | m-iPP (Sample 4) + 5 wt % m-sPP (Sample 2) |

*Comparative example, not an example of the invention.

The SMS fabric samples are then subjected to gamma radiation using a Cobalt 60 radiation source at the dosage levels set forth in Table 3. In certain cases, the fabric was oven aged in a convection oven at a temperature of approximately 60° C. for six weeks. Various properties of the SMS fabric material were then measured and are set forth in Tables 3 A&B below. These included machine-direction (MD) and cross-direction (CD) grab strength, tear strength, and elongation. The term "trap" refers to the test specimen shape. In Table 3C, the percent elongation retained in both the machine direction and the cross machine direction are calculated and displayed. Sample 2 is then compared to Sample 1 and Sample 4 is compared to Sample 3 and the comparative retained elongation is calculated and displayed in Table 3C. Overall average percent elongation retention is also calculated and displayed in Table 3C.

TABLE 3A

| SMS Fabric Sample | Radiation and Aging Conditions | Basis Weight (oz./yd) | MD Grab (lb/in) | CD Grab (lb/in) | MD-Trap Tear (g) | CD-Trap Tear (g) |
|---|---|---|---|---|---|---|
| 1 | Non-Irradiated | 1.46 | 28 | 20 | 14 | 11 |
|  | 3 Mrads | 1.46 | 21 | 14 | 10 | 6 |
|  | 3 Mrads + 6 wks. Oven Aging | 1.46 | 19 | 13.5 | 6.2 | 4 |
|  | 6 Mrads | 1.46 | 17 | 12 | 8 | 4 |
|  | 6 Mrads + 6 wks. Oven Aging | 1.42 | 13.1 | 8.8 | 3.2 | 2.2 |
|  | 10 Mrads | 1.42 | 11 | 6 | 2.3 | 1.5 |
| 2 | Non-Irradiated | 1.52 | 28 | 20 | 14 | 9 |
|  | 3 Mrads | 1.52 | 18 | 14 | 13 | 7 |
|  | 3 Mrads + 6 wks. Oven Aging | 1.48 | 18.1 | 14.6 | 7.4 | 4.5 |
|  | 6 Mrads | 1.48 | 18 | 17 | 8 | 5 |
|  | 6 Mrads + 6 wks. Oven Aging | 1.59 | 13.7 | 7.7 | 3.3 | 2.3 |
|  | 10 Mrads | 1.59 | 15 | 10 | 7 | 3.4 |
| 3 | Non-Irradiated | 1.39 | 25 | 18 | 12 | 8 |
|  | 3 Mrads | 1.39 | 22 | 17 | 11 | 7 |
|  | 3 Mrads + 6 wks. Oven Aging | 1.37 | 16.7 | 13.5 | 6.7 | 4.5 |
|  | 6 Mrads | 1.37 | 19 | 13 | 7 | 5 |
|  | 6 Mrads + 6 wks. Oven Aging | 1.33 | 14.2 | 9.6 | 4.3 | 2.6 |
|  | 10 Mrads | 1.33 | 15 | 11 | 6 | 3 |

TABLE 3A-continued

| SMS Fabric Sample | Radiation and Aging Conditions | Basis Weight (oz./yd) | MD Grab (lb/in) | CD Grab (lb/in) | MD-Trap Tear (g) | CD-Trap Tear (g) |
|---|---|---|---|---|---|---|
| 4 | Non-Irradiated | 1.48 | 25 | 18 | 15 | 9 |
|   | 3 Mrads | 1.48 | 18 | 16 | 10 | 6 |
|   | 3 Mrads + 6 wks. Oven Aging | 1.50 | 21 | 14.7 | 7.1 | 5.1 |
|   | 6 Mrads | 1.50 | 19 | 13 | 8 | 6 |
|   | 6 Mrads + 6 wks. Oven Aging | 1.53 | 15.1 | 11.1 | 4.5 | 3.1 |
|   | 10 Mrads | 1.53 | 13 | 8.6 | 6 | 3 |

TABLE 3B

| SMS Fabric Sample | Radiation and Aging Conditions | MD-Elong. (%) | CD-Elong. (%) | Air Perm. (cfm/ft$^2$) |
|---|---|---|---|---|
| 1 | Non-Irradiated | 80 | 93 | 154 |
|   | 3 Mrads | 45 | 54 | 143 |
|   | 3 Mrads + 6 wks. Oven Aging | 36.4 | 43 | 145 |
|   | 6 Mrads | 39 | 41 | 138 |
|   | 6 Mrads + 6 wks. Oven Aging | 22.9 | 23.5 | 143 |
|   | 10 Mrads | 17 | 19 | 143 |
| 2 | Non-Irradiated | 79 | 93 | 138 |
|   | 3 Mrads | 68 | 64 | 168 |
|   | 3 Mrads + 6 wks. Oven Aging | 38.8 | 43.4 | 165 |
|   | 6 Mrads | 49 | 43 | 150 |
|   | 6 Mrads + 6 wks. Oven Aging | 22.7 | 31.4 | 178 |
|   | 10 Mrads | 35 | 49 | 148 |
| 3 | Non-Irradiated | 101 | 103 | 136 |
|   | 3 Mrads | 57 | 62 | 138 |
|   | 3 Mrads + 6 wks. Oven Aging | 40.8 | 42.6 | 169 |
|   | 6 Mrads | 40 | 42 | 142 |
|   | 6 Mrads + 6 wks. Oven Aging | 30.5 | 36.8 | 174 |
|   | 10 Mrads | 28 | 29 | 139 |
| 4 | Non-Irradiated | 93 | 94 | 136 |
|   | 3 Mrads | 61 | 70 | 144 |
|   | 3 Mrads + 6 wks. Oven Aging | 38.7 | 41 | 153 |
|   | 6 Mrads | 48 | 53 | 143 |
|   | 6 Mrads + 6 wks. Oven Aging | 28.5 | 32.8 | 124 |
|   | 10 Mrads | 30 | 40 | 130 |

TABLE 3C

| SMS Fabric Sample | Radiation and Aging Conditions | MD-% Elong. Retained | MD Comp % Retained | CD-% Elong Retained | CD Comp % Retained | Overall Avg MD/CD |
|---|---|---|---|---|---|---|
| 1 | Non-Irradiated | — | | — | | |
|   | 3 Mrads | 56 | | 58 | | |
|   | 3 Mrads + 6 wks. Oven Aging | 45 | | 46 | | |
|   | 6 Mrads | 48 | | 44 | | |
|   | 6 Mrads + 6 wks. Oven Aging | 28 | | 25 | | |
|   | 10 Mrads | 21 | | 20 | | |
| 2 | Non-Irradiated | — | — | — | — | 15.6/11.0 |
|   | 3 Mrads | 86 | 36 | 69 | 11 | |
|   | 3 Mrads + 6 wks. Oven Aging | 49 | 5 | 47 | 1 | |
|   | 6 Mrads | 62 | 14 | 46 | 2 | |
|   | 6 Mrads + 6 wks. Oven Aging | 28 | 0 | 34 | 9 | |
|   | 10 Mrads | 44 | 23 | 52 | 32 | |
| 3 | Non-Irradiated | — | | — | | |
|   | 3 Mrads | 56 | | 60 | | |
|   | 3 Mrads + 6 wks. Oven Aging | 41 | | 41 | | |
|   | 6 Mrads | 40 | | 41 | | |
|   | 6 Mrads + 6 wks. Oven Aging | 30 | | 36 | | |
|   | 10 Mrads | 28 | | 28 | | |
| 4 | Non-Irradiated | — | — | — | — | 5.4/8.2 |
|   | 3 Mrads | 66 | 10 | 74 | 14 | |
|   | 3 Mrads + 6 wks. Oven Aging | 41 | 0 | 44 | 3 | |
|   | 6 Mrads | 52 | 12 | 56 | 15 | |
|   | 6 Mrads + 6 wks. Oven Aging | 31 | 1 | 33 | −3 | |
|   | 10 Mrads | 32 | 4 | 34 | 6 | |

The SMS fabric samples incorporating 5 percent metallocene polypropylene components in the spunbond layers out performed those fabric samples that did not incorporate 5 percent metallocene polypropylene components at retaining toughness after exposure to radiation and after exposure to both radiation and oven heat aging. For example, the SMS fabrics of the invention have a 50% or greater retention of machine direction elongation strength at a radiation dose of 3-6 Mrads While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

What is claimed is:

1. A polymer material comprising a blend of an isotactic propylene polymer, a syndiotactic propylene polymer and a benzofuran-2-one stabilizing agent, wherein the isotactic propylene polymer has a molecular weight distribution (Mw/Mn) of 4.0 or less and a xylene solubles of 2 percent or less, and wherein the polymer material provides a SMS fabric material having a 50% or greater retention of machine direction elongation strength at a radiation dose of 3-5 Mrads.

2. A polymer material comprising a blend of an isotactic propylene polymer, a syndiotactic propylene polymer and a benzhydrol or derivative of benzhydrol stabilizing agent, wherein the isotactic propylene polymer has a molecular weight distribution (Mw/Mn) of 4.0 or less and a xylene solubles of 2 percent or less, and wherein the polymer material provides a SMS fabric material having a 50% or greater retention of machine direction elongation strength at a radiation dose of 3-5 Mrads.

* * * * *